United States Patent [19]

Hoadley

[11] 4,089,608
[45] May 16, 1978

[54] NON-CONTACT DIGITAL CONTOUR GENERATOR

[76] Inventor: Howard W. Hoadley, 9413 Petit Ave., Sepulveda, Calif. 91343

[21] Appl. No.: 734,600

[22] Filed: Oct. 21, 1976

[51] Int. Cl.$^2$ .............................................. G01B 9/00
[52] U.S. Cl. ........................................ 356/156; 356/1; 356/167; 358/106
[58] Field of Search ....................... 356/156, 167, 1, 2; 358/101, 106, 107

[56] References Cited

U.S. PATENT DOCUMENTS

| | | | |
|---|---|---|---|
| 3,187,185 | 6/1965 | Milnes | 356/1 |
| 3,565,531 | 2/1971 | Kane et al. | 356/156 |
| 3,610,154 | 10/1971 | Pirlet | 356/1 |

FOREIGN PATENT DOCUMENTS

| | | | |
|---|---|---|---|
| 1,920,063 | 11/1970 | Germany | 356/2 |

Primary Examiner—John K. Corbin
Assistant Examiner—R. A. Rosenberger
Attorney, Agent, or Firm—John T. Matlago

[57] ABSTRACT

A non-contact digital contour generator is provided for generating the X, Y and Z coordinates of the complex contoured surface of a three-dimensional model. The generator includes an illuminator digitally movable along the Z axis for providing contour lines about the model at successive levels or planes thereof. A camera having its optical axis disposed perpendicular to the Z planes is also digitally movable along the Z axis and provides for focussing the images of the contour lines on the model onto the X-Y image plane of the camera. Located within the camera so as to lie in the image plane thereof are scanning means including photosensitive means operable to digitally scan the image plane and thereby provide X and Y coordinates of the images of the contour lines which together with the Z coordinates of the illuminator define the surface of the model.

11 Claims, 16 Drawing Figures

NON-CONTACT DIGITAL CONTOUR GENERATOR

BACKGROUND AND SUMMARY OF THE INVENTION

This invention relates to digital contour generators and more particularly to apparatus for generating digitized data defining coordinates of the surface contours of complex-shaped three-dimensional objects.

Accepted procedures for mass producing three-dimensional objects generally involve the initial creation of a full-size or fractional-scale model thereof. Dies, patterns, or other tooling are then made that can reproduce the exact configurations of the curved surfaces and other complexities of the original model, plus other features such as attaching points, strengthening ribs, mating surfaces, etc.

Dimensional engineering drawings of such objects are extremely costly and do not provide the flexibility usually needed for making male and female dies, patterns to required shrink dimensions, and inspection tools and gages. In addition, it is so time consuming to go through such a transfer process that the drawing phase is bypassed if at all possible. Engineering or styling changes further complicate the problem. As a result, there are frequently no complete records or any way of documenting, expediting and coordinating the engineering in a systematic manner.

Numerical control machine tools can, with proper control in digital form, eliminate the necessity for most drawings. However, digitized X, Y and Z coordinate data from the model must first be obtained. Conventional apparatus for obtaining such data requires not only some direct contact with the model, but is slow operating and subject to mechanical restrictions.

Accordingly, one of the objects of the present invention is to provide non-contact apparatus for digitizing the X, Y and Z coordinates of three-dimensional objects having complex contoured surfaces.

Another object of the invention is to provide apparatus for automatically digitally generating, at high speed, coordinate data defining the outer surface of a three-dimensional model whose shape includes non-uniformly curved portions.

Still another object of the present invention is to provide apparatus for automatically generating the X, Y and Z coordinates of the surface of an irregularly shaped three-dimensional model for use in preparing a numerical control tape for making drawings, dies and tools as needed to produce the model.

Briefly, the digitizing apparatus in accordance with the present invention provides an adjustable illuminator means that is capable of illuminating a model to provide a contour line thereabout at selected levels or planes along its height which represents the Z coordinate axis. A camera disposed with its optical axis perpendicular to the plane of the illumination provides for projecting the contour line thus formed on the model onto the image or focal plane of the camera. The image plane of the camera represents the X and Y coordinate plane. Located within the camera so as to lie in the image plane thereof are photosensitive sensing means operable to digitally scan the image plane and thereby provide X and Y coordinates of the image of the contour line focussed thereon. These X and Y coordinates together with the Z coordinate of the plane of the contour line on the model provide digitized data which can be fed into an electronic computer and modified to prepare a numerical control tape useful for operating machine tools to duplicate the model.

Still further objects, advantages and features of the invention will become more fully apparent to one skilled in the pertinent art when the following specification and claims are read in the light of the accompanying drawings.

DETAILED DESCRIPTION OF THE INVENTION

Figure 1:
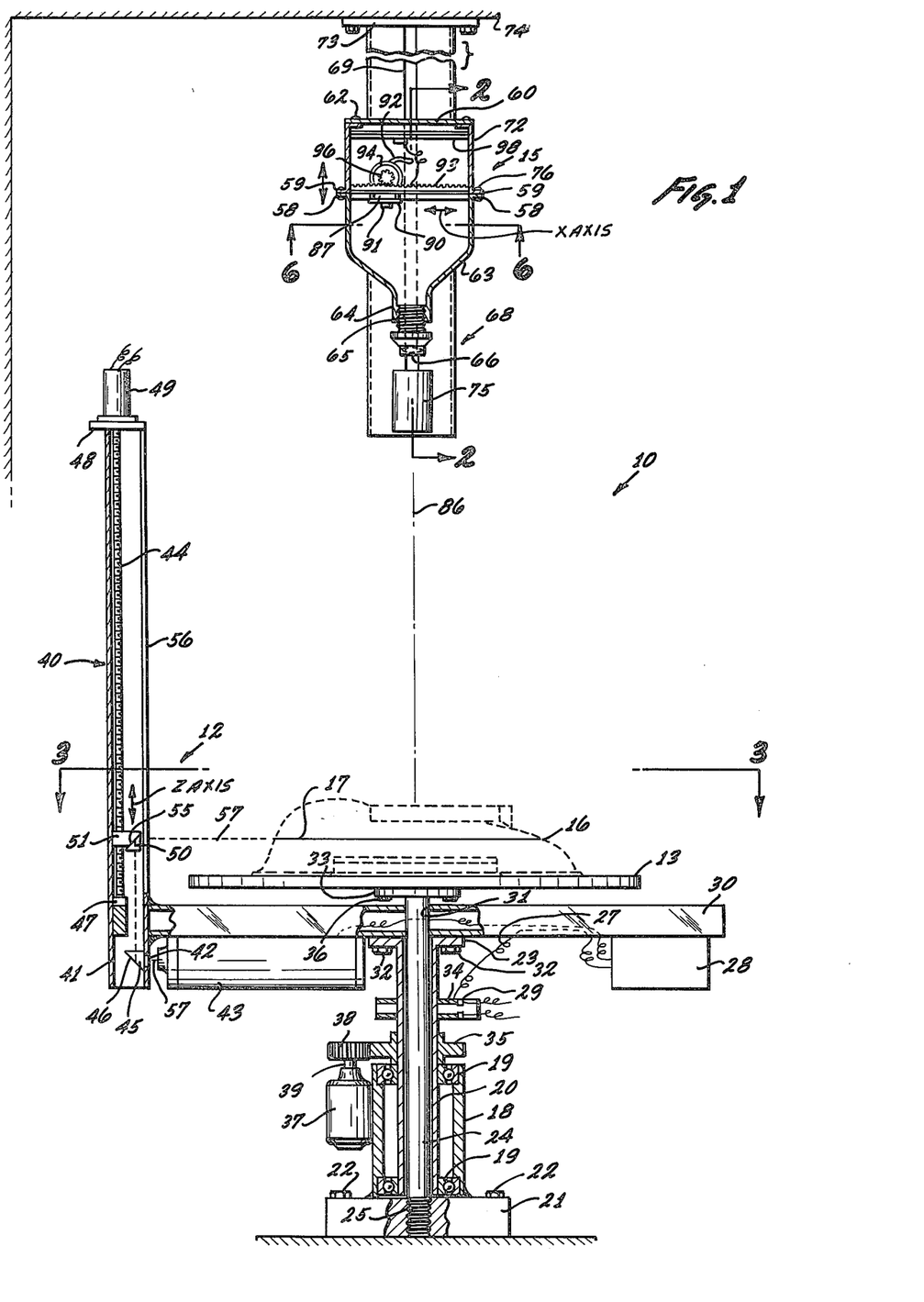
FIG. 1 is an overall view of the three-dimensional non-contact digital contour generator of the present invention.

Referring to the drawings, the non-contact digital contour generator 10 of the present invention includes a Z illuminator 12 mounted for rotation about a circular stationary table 13 and a camera 15 mounted to view a model 16 placed on the table. The model 16 which may be made of clay is a three-dimensional object having a complex surface including non-uniformly curved portions which cannot be readily represented by dimensional engineering drawings.

Describing the apparatus in detail, a vertically disposed bearing housing 18 enclosing upper and lower ball-bearings 19 is attached by welding to the upper surface of a base 21. The base 21 is, in turn, attached by bolts 22 to the floor of an enclosure provided for the contour generator 10. A hollow rotatable shaft 20 extends down into the bearing housing 18 and is adapted to rotate in the ball-bearings 19.

An upright post 24 extends down through the hollow rotatable shaft 20 with its lower end threadably engaged in a hole 25 provided in the center of the base 21. A horizontally disposed hollow metal beam member 30 having a rectangular cross section is provided with a vertical circular opening 31 midway of the longitudinal ends thereof. The beam member 30 is disposed with its opening 31 freely positioned over the end of the post 24 such that it rests on and is attached by bolts 32 to the side-ears 23 provided on the top of the hollow rotatable shaft 20. Attached to the top of the post 24 is a flange 33. A circular table 13 is concentrically mounted on the flange 33 and fixed thereto by bolts 36.

It should now be clear that the table 13 is supported on post 24 in a stationary position while the horizontal beam member 30 is supported below the table on the shaft 20 which is mounted within the ball-bearings 19 for rotation about the axis thereof.

A long upright tube 40 is attached by welding to one end of the horizontal beam member 30 with a short lower portion 41 thereof extending below the beam member. Mounted beneath the beam member 30 opposite the lower tube portion 41 is a laser unit 43. A three-sided prism 45 having a mirrored back surface 46 is secured in position by clips (not shown) within the lower tube portion 41 opposite an opening 42 in the wall thereof. Mounted within the upright tube 40 is a lead screw 44 whose lower end is supported in a journal block 47 secured to the inner wall of tube 40. Mounted on a shelf 48 attached to the top of the upright tube 40 is a Z stepper motor 49. The shaft of stepper motor 49 is connected to rotate the lead screw 44. A drive nut 51 whose outer end is curved to slideably seat and ride against the curved inner wall of tube 40 is provided on the lead screw 44. The inner end portion of the drive nut 51 is provided with side clips 53 for holding a three-sided prism 50 having a mirrored back surface 55. A longitudinal slot 56, which faces the center of the table 13, extends along the length of the tube 40.

Mounted on the side of the bearing housing 18 is a motor 37 having a drive gear 38 on its shaft 39 which drives a gear 35 keyed to the hollow rotatable shaft 20. A laser power supply 28 is attached to the bottom of the beam member 30 opposite the laser unit 43. Clock pulses to drive the Z stepper motor 49 and current for the laser supply 28 are supplied to the rotating Z illuminator 12 through stationary brushes 29 which contact conductive slip rings 34 on the rotating shaft 20. Conductors 27 extend from the slip rings and through the hollow beam member 30 to these components.

It should now be clear that the laser beam of light 57 emitted by the laser unit 43 is reflected upwardly off the mirrored back surface 46 of the fixed prism 45 onto the mirrored back surface 55 of the movable prism 50, and then reflected from the latter through the longitudinal slot 56 in the upright tube 40 onto the surface of the model 16 which is positioned on the table 13.

It should now be further clear that the elevation of the movable prism 50 and therefore the Z plane or level at which the laser light beam 57 is reflected toward the model 16 can be precisely varied digitally by feeding clock pulses to the Z stepper motor 49. As will be discussed further hereinafter, a binary-coded decimal Z counter 61 (FIG. 10) counts these clock pulses and provides a digitized output indicative of the Z coordinate corresponding to the position of the laser light beam 57. The Z coordinate is measured from a predetermined reference point which may be the top of the table 13, for example.

The typical model 16 to be digitized by the contour generator 12 is in the shape of a die cast aluminum housing for a self-propelled lawn mower. It should be noted from FIG. 4 that the model 16 has an unusually curved upper surface which varies in all three coordinate axes thereof. As the Z illuminator 12 is rotated about the table 13, by energizing the motor 37, the laser beam 57 of light reflected from the prism 50 provides for generating a line of intersection, i.e., a contour line 17, which defines all points of the model surface that are common with the scan plane. The surface of the model 16 is preferably painted with a phosphorescent paint to enhance its ability to tend to continuously reflect the contour line 17 formed thereon by the laser beam 57.

Adjustably mounted on a vertically disposed hollow guideway support 68 suspended from the ceiling 74 of the enclosure provided for the non-contact digital contour generator 10 is the camera 15. Camera 15 comprises a lower housing compartment 63 having ears 58 on the top front and sides thereof and an upper housing compartment 72 having mating ears 59 on the bottom front and sides thereof. Screws 76 passing through openings in the ears 58 and 59 hold the compartments together.

The camera lower housing compartment 63 has a generally rectangular cross section which tapers downwardly to provide a neck 64 on the lower portion thereof. Adjustably threadably mounted within the opening of the neck is a fitting 65 which holds an objective lens 66. A drive nut 67 which is enclosed to slide within the hollow guideway support 68 has a rectangular projection 70 on the front thereof which is fitted to ride along a longitudinal slot 69 provided on the front wall of the guideway support 68. The rear wall of the camera lower housing compartment 63 is attached by screws 77 to the projection 70. Extending through the drive nut 67 is a lead screw 71 which is supported at its upper end by a journal block 73 securing the guideway support 68 to the ceiling 74 of the enclosure for the apparatus. The lower end of the lead screw 71 is connected to be rotated by a stepper motor 75.

Figures 2, 4, 5, 7:
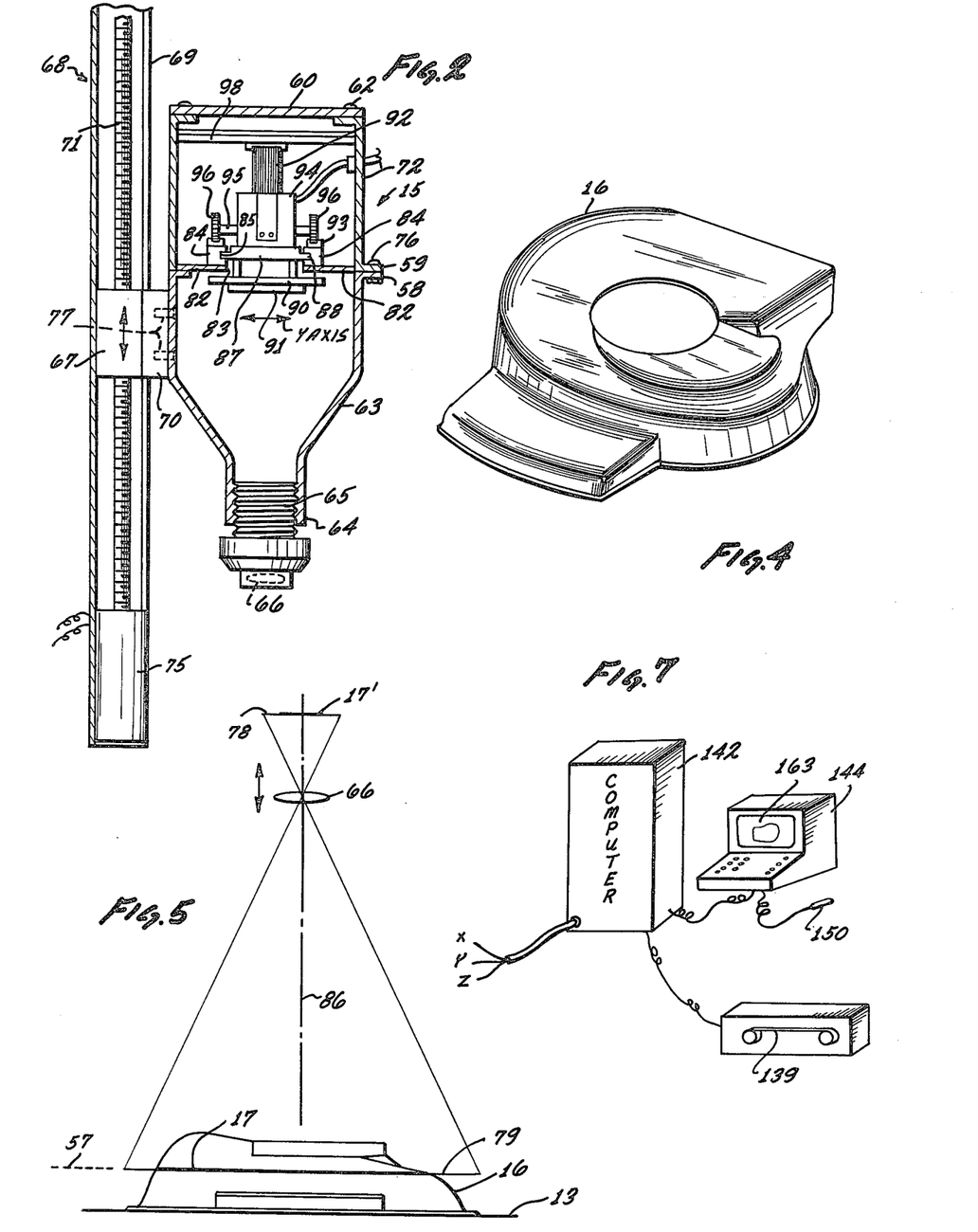
FIG. 2 is a vertical sectional view of the camera as taken along lines 2—2 of FIG. 1.
FIG. 4 is a perspective view of a typical model whose complex contoured surface can be digitized by the system shown in FIG. 1.
FIG. 5 is a diagrammatic illustration showing the objective lens of the camera focussed to view a selected plane of the model.
FIG. 7 illustrates the equipment which makes use of the X, Y and Z coordinate data generated by the digital contour generator shown in FIG. 1.
Figure 3:
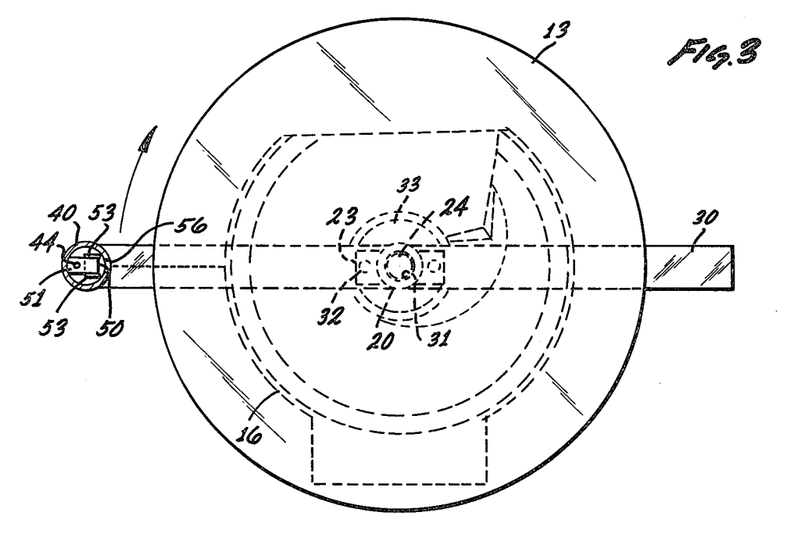
FIG. 3 is a plan view of the Z illuminator and table as taken along lines 3—3 of FIG. 1.

The camera upper housing compartment 72 has a rectangular cross section. The top of compartment 72 is provided with a lid 60 held by screws 62 and the bottom of compartment 72 is provided with side supports 82 spaced apart to provide a central rectangular opening 83. Mounted on the side supports 82 on either side of the opening 83 are a pair of guide members 84 having opposing grooves 85. A carrier 87 is provided with tongues 88 on either side thereof which slideably fit within the grooves 85 on the guide members. Attached below the carrier 87 is a circuit card 90 having a linear photodiode array 91 mounted on the lower surface thereof.

Attached to the upper surface of each of the guide members 84 are racks 93. Mounted on the top of the carrier 84 is an X stepper motor 94 provided with a shaft 95 which extends from either side thereof. The shaft 95 has pinions 96 on the ends thereof which engage the respective racks 93. A tape conductor 92 flexibly connects the X stepping motor 94 and carrier 87 to an additional circuit board 98 on the upper end of compartment 72.

It should now be clear that the linear photodiode array 91 on the bottom of the carrier 87 can be precisely digitally moved in either direction along the X axis of the image plane 78 of the camera 15 from one side of the lower housing compartment 63 to the other side thereof by feeding clock pulses to the X stepper motor 94. As will be discussed hereinafter, a binary-coded-decimal X counter 140 (FIG. 10) counts these pulses and provides a digitized output indicative of the X coordinate of the linear array 91.

It should be further noted that the optical axis 86 of the camera 15 is disposed normal to the plane of the contour line 17 formed by the laser light beam 57 on the model 16. Furthermore, the camera 15 can be vertically displaced relative to the table 13 in accordance with the actuation of the stepper motor 75 connected to lead screw 71. The stepper motor 75 is initially used to properly position the object plane 79 of the camera 15 (as shown in FIG. 5) in the plane of the contour line 17 of light produced on the model by the Z illuminator 12 such that the contour line 17 is imaged, as image 17' on the camera image plane 78. Thereafter, the stepper motor 75 is used to reposition the camera and, therefore, the object plane 79 such that the latter precisely remains located in the plane of the contour line 17 of light produced by the Z illuminator 12, as the latter is repositioned by feeding clock pulses to the Z stepper motor 49. The choice of projecting lens 66 used in camera 15 is preferably based on the need for a relatively long focal length and wide aperture (fast) lens. Such an objective lens provides a shallow depth of field and the necessary speed for projecting its field of view with relatively little light.

Figure 6:
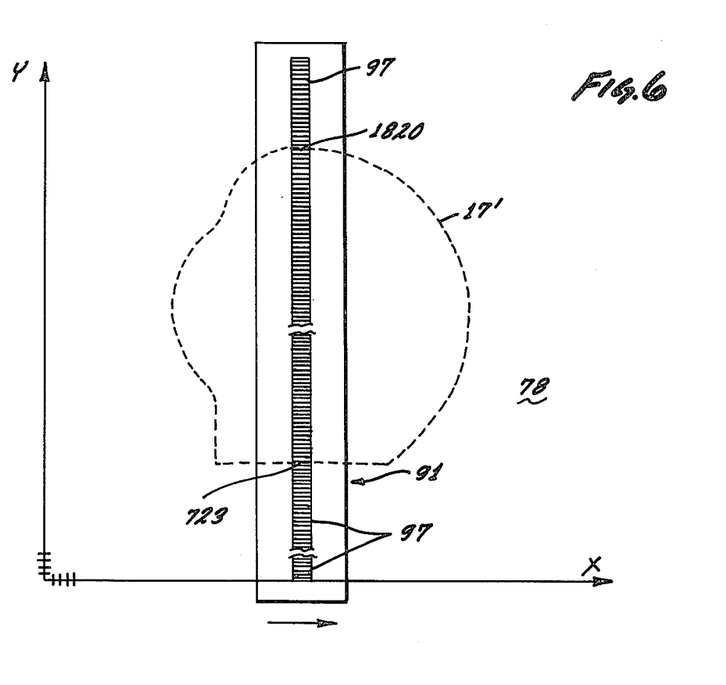
FIG. 6 is a sectional view of the camera showing the image plane thereof as taken along lines 6—6 of FIG. 1.
Figures 10, 13:
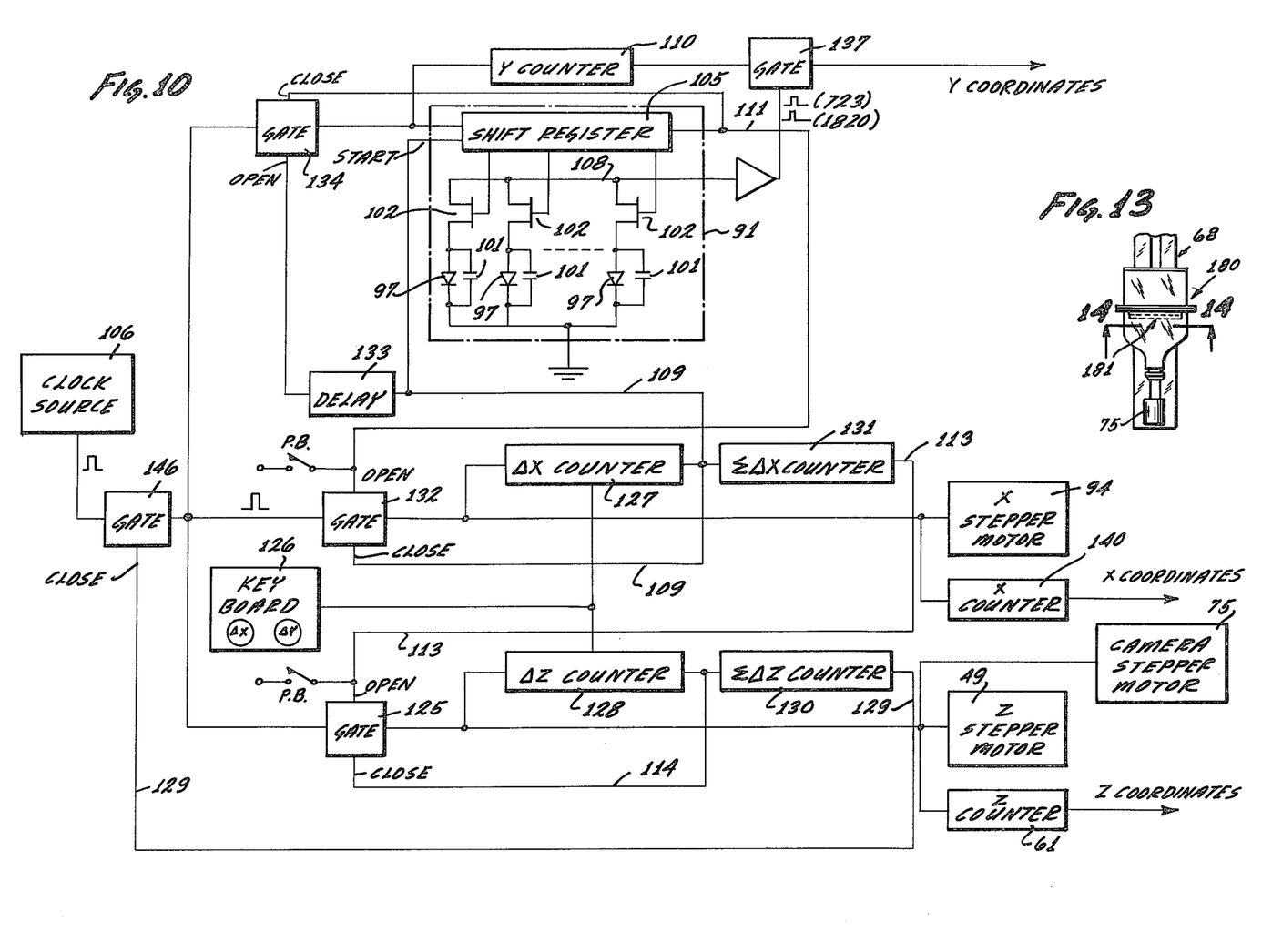
FIG. 10 is a functional block diagram of the electrical circuit associated with the apparatus of FIG. 1.
FIG. 13 is a view of an alternate embodiment of the camera for use with the Z illuminator shown in FIG. 1.

The image plane 78 of the camera 15, as viewed along line 6—6 in FIG. 1, is shown in FIG. 6. The linear array 91 comprises a series of a large number, on the order of 2000, bar-shaped photodiodes 97. The series of photodiodes 97 form a long narrow rectangle with each photodiode 97 being on the order of 0.001 of an inch across and successive photodiodes having on the order of a 0.001 of an inch spacing. As shown, the linear array 91 is located and oriented in the image plane 78 so as to be parallel to the Y axis and orthogonal to the X axis thereof with the lowermost photodiode 97 corresponding to the base of the Y axis. It is assumed in FIG. 6 that the carrier 87 on which the linear array 91 is mounted has been physically incrementally moved along the X axis by the X stepper motor 94 from an extreme left initial location, corresponding to the base of the X axis, to the position shown. Furthermore, it is assumed that prism 50 of Z illuminator 12 has been incrementally positioned from the top of the table 13, corresponding to the base of the Z axis, to the position shown in FIG. 1 to create the contour line 17 of light about the periphery of the model 16. The projecting lens 66 then serves to project the contour line 17 to form image 17' on the image plane 78 which is common with the plane of the linear array 91. Thus the image 17' of the contour line 17 causes particular photodiodes of the series, such as photodiodes 723 and 1820 indicated, to be activated by the image 17'. Thus, as will be more fully described hereinafter, as a result of the scanning of the photodiodes of the linear array 91 by a shift register 105, digitized counts corresponding to Y coordinates 723 and 1820, for example, would be sensed on the output of a gate 137 (FIG. 10). These Y coordinates along with the X and Y coordinates are fed to a computer 142, as shown in FIG. 7.

An electrical circuit is associated with the photodiodes 97. Thus, as shown in FIG. 10, each photodiode 97 has associated therewith a capacitor 101 and a MOS transistor switch 102. The circuitry associated with the linear array 91 further includes the MOS shift register 105 activated by clock pulses from a clock pulse source 106. As a "start" pulse generated by the circuit is advanced on successive clock pulses through stages of the shift register 105, the successive transistor switches 102 associated with the photodiodes 97 in the array are opened. As each photodiode is accessed, its associated capacitor 101 is charged to the potential of the common video line 108 and left open until the next scan of the shift register 105. Thus, in between scans of the shift register 105, one or more of the capacitors 101 will be discharged by the image 17' of the contour line 17 activating one or more of the photodiodes 97. Then, each time a photodiode 97 is interrogated during the following scan, its associated capacitor charge must be replaced through the video line 108 creating an output pulse thereon. During each scan of the linear array 91 one or more of the photodiodes 97 may provide such output pulses.

The clock pulses fed into the shift register 105 are also fed to the binary-coded-decimal Y counter 110 which keeps track of the photodiodes 97 being interrogated in the linear array 91 and provides a digitized output count indicative thereof. As will be discussed hereinafter, this output count is fed to the gate 137 which is opened only if a pulse is received on the common video line 108 at that instant. The output count corresponds to the Y coordinate.

It should now be clear that the horizontal beam member 30 is rotated by the motor 37 causing the laser light beam 57 to make a 360 degree external sweep of the model 16. The collimated laser beam 57 tranverses the periphery of the model and reflects off the surface thereof to form contour line 17 which is imaged by the objective lens 66 of the camera 15 onto the image plane 78 in which the linear array 91 resides. This causes selected ones of the photodiodes 97 in the linear array 91 to be activated to enable the X and Y coordinate points of the contoured surface being digitized to be sensed. The size of the contour line image 17' as focussed on the image plane 78 is typically on the order of 1/25th the actual size of the contour line 17 formed on the model 16.

Figure 9:
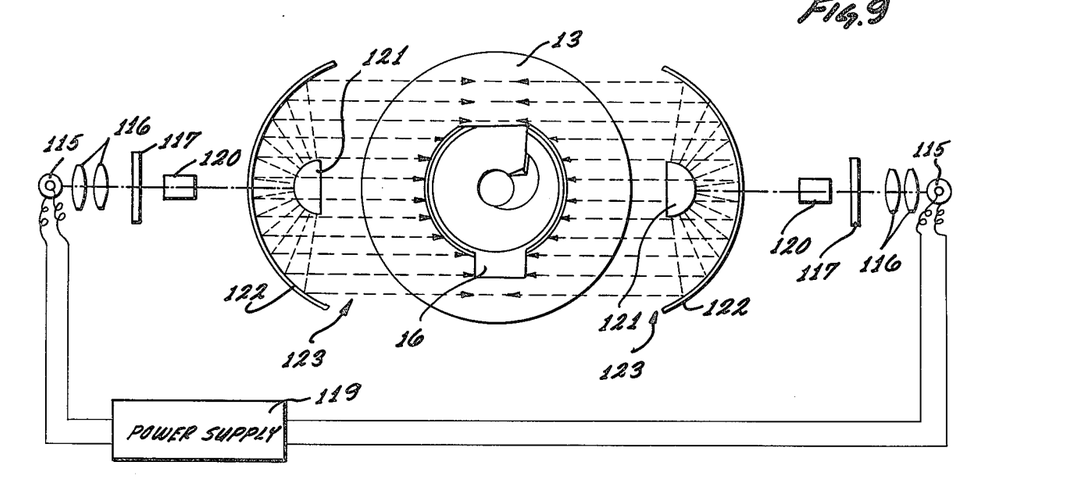
FIG. 9 is a plan view showing the model of FIG. 4 being illuminated by a pair of the Z illuminators shown in FIG. 8.

It should be noted that instead of rotating a laser light beam 57 about the model 16, as shown in FIGS. 1 and 2, to truncate the model 16 at any Z axis station, an intense, fixed thin plane or sheet of light 123 may be provided as shown in FIG. 9 to illuminate the model 16. When the sheet of light 123 intercepts the surface of the model it generates a line of interception which defines all points of the model surface which are common with the plane of the light. Apparatus to produce such a sheet of light is shown in FIG. 9. Thus, light from a high intensity source, such as a compact, high pressure vapor arc lamp 115 operating from a suitable power supply 119 is concentrated by condenser elements 116. A portion of the light passes through a horizontal slit 117 in mask 118 and through lens 120. The narrow beam so obtained is then expanded by a diverging mirror 121 which is slightly tilted so as to direct its rays rearwardly and slightly upwardly onto a concave mirror 122. The curvature of the latter is such that the light is reflected therefrom as parallel rays in a thin sheet 123 toward the model 16.

Figure 8:
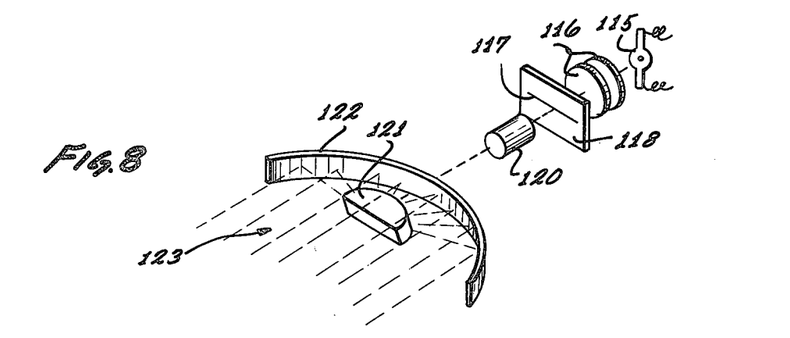
FIG. 8 is a perspective exploded view of another embodiment of the Z illuminator.

In practice, as shown in FIG. 9, illumination of this type would include apparatus for providing two vertically aligned sheets of light, one on each side of the model, for example. Such a light plane 123 would be continuous as compared to the light plane provided by the rotating laser beam 57. Similarly to the movable prism 50 in the FIG. 1 embodiment, the light sheet forming apparatus of the Z illuminator shown in FIG. 8, is mounted on shelves (not shown) attached to drive nuts on lead screws which are vertically adjustable to a desired level by use of Z stepper motors.

An overall functional block diagram of the electrical circuit for the non-contact contour generator 10 of the present invention is shown in FIG. 10. Each clock pulse supplied from clock source 106 corresponds to one thousandth of an inch, for example. A manual keyboard 126 is connected to provide an initial setting of a Z increment counter 127 and a Z increment counter 128. The initial setting of the X increment counter 127, which may range from a few thousandths to a hundred thousandths of an inch, or more, determines the increment with which the linear photodiode array 91 is successively physically moved along the X axis of the camera image plane 78 by the X stepper motor 94. Likewise, the initial setting of the Z increment counter 128, which may range from a few thousandths to a hundred thousandths of an inch, or more, determines the increment with which the laser light beam 57 provided by the Z illuminator 12 is successively moved along the Z axis by the Z stepper motor 49.

Each time the laser light beam 57 of the Z illuminator 12 is to be repositioned to a different level, clock pulses pass through Z input gate 125 to simultaneously energize the Z stepper motor 49 and the camera stepper motor 75, and to advance the Z increment counter 128. The Z counter 61 accumulates all the clock pulses received by the Z stepper motor 49 and provides a digitized output count corresponding to the Z coordinate of the plane of the contour line 17 formed about the surface of the model 16. When a number of clock pulses corresponding to the Z increment has been received by the Z increment counter 128, it provides an output pulse on line 114 which closes the Z input gate 125. The successive incremental advance of the Z stepper motor 49 will continue in this manner until the Z range counter 130 indicates the desired number of Z increments have been transversed along the Z axis. At that time it provides an output pulse on line 129 which will close normally open clock gate 146 and terminate the operation of the apparatus.

In a similar manner, each time the linear array 91 is to be repositioned along the X axis, clock pulses pass through X input gate 132 to the X stepper motor 94 and the X increment counter 127. An X counter 140 accumulates the clock pulses received by the X stepper motor 94 and provides a digitized output count corresponding to the X coordinate. When a number of clock pulses corresponding to the X increment has been received by the X increment counter 127, the latter provides an output pulse on line 109 which closes the X input gate 132. This successive incremental advance of the X stepper motor 94 continues until an X range counter 131 indicates the carrier 87 for the linear array 91 has been advanced along the X axis the desired number of X increments.

Each time the X increment counter 127 puts out an output pulse on line 109 indicating the linear array 91 has been advanced the desired X increment, this output pulse is fed to the "start" input of the shift register 105. In addition, this output, after passing through microsecond delay 133 opens Y input gate 134 to feed clock pulses to advance the "start" pulse through the shift register 105. Each clock pulse opens a successive transistor switch 102 and enables the associated capacitor 101 to be charged from the video line 108 by the amount of current, if any, passed through the associated photodiode 97. Each time one of the photodiodes 97 being interrogated has the light image 17' of the contour line 17 of the model focussed thereon, it conducts current from its associated capacitor 101 and thus causes a pulse to be placed on the common video line 108 when the capacitor is again charged. The clock pulses fed to shift register 105 are counted by the Y counter 110 whose digitized output corresponds to the Y coordinate of the Y axis. The digitized output count of the Y counter 110 is fed through the gate 137 only when a pulse appears on the common video line 108. Ordinarily this would happen twice each scan of the linear array 91. These Y coordinates, so provided, are transferred along with the X and Z coordinates to the memory of the computer 142, for example, as shown in FIG. 7. There, by use of a software program, this data is manipulated and modified into proper form for the producing of a tape 139 useful for controlling numerical control machine tools or drafting machines. Simultaneously, computer data can be displayed on the screen 163 of an interactive terminal 144 so that the operator can manipulate the data by use of a light pen 150, as well known in the art. In this way additions can be made, for example, attaching points, holes or cutouts can be defined, or the image might be modified for a model change.

Each overflow pulse on output line 111 of the shift register 105, indicative of the end of the linear array 91 scanning of the photodiodes 97 along the Y axis, is fed to the X input gate 132 causing it to open to again feed clock pulses to the X stepper motor 94 to bodily advance the linear array 91 along the X axis of the camera image plane 78 to a new X coordinate incremental position. Simultaneously, these pulses are counted by the X increment counter 127 and when an overflow output pulse is provided on line 109 it closes the X input gate 132 to terminate the flow of clock pulses. As stated before, this overflow output pulse on line 109 from the X increment counter 127 is also fed to the "start" input of the shift register 105 for the purpose of loading it. The output pulse on line 109 is also fed through delay 133, to again open up the Y input gate 134 for enabling clock pulses to again be fed into the shift register 105 to enable the photodiodes 97 to be successively interrogated to determine the Y coordinates of image 17' for the new X coordinate position of the linear array 91.

The operation of successively incrementing the X stepper motor 94 to move the linear array 91 to a new X coordinate position, and then interrogating the linear photodiode array 91, continues until the range of the X axis to be sensed, as determined by an output pulse from the X range counter 131, indicates a completion of the X-Y digitizing of a particular Z plane of the model 16. At such time the output pulse on the line 113 is fed to open the Z input gate 125 and enable clock pulses to be received to advance the Z stepper motor 49 and therefore the Z illuminator to a new Z plane as determined by the Z increment setup on the Z increment counter 128.

Figure 11:
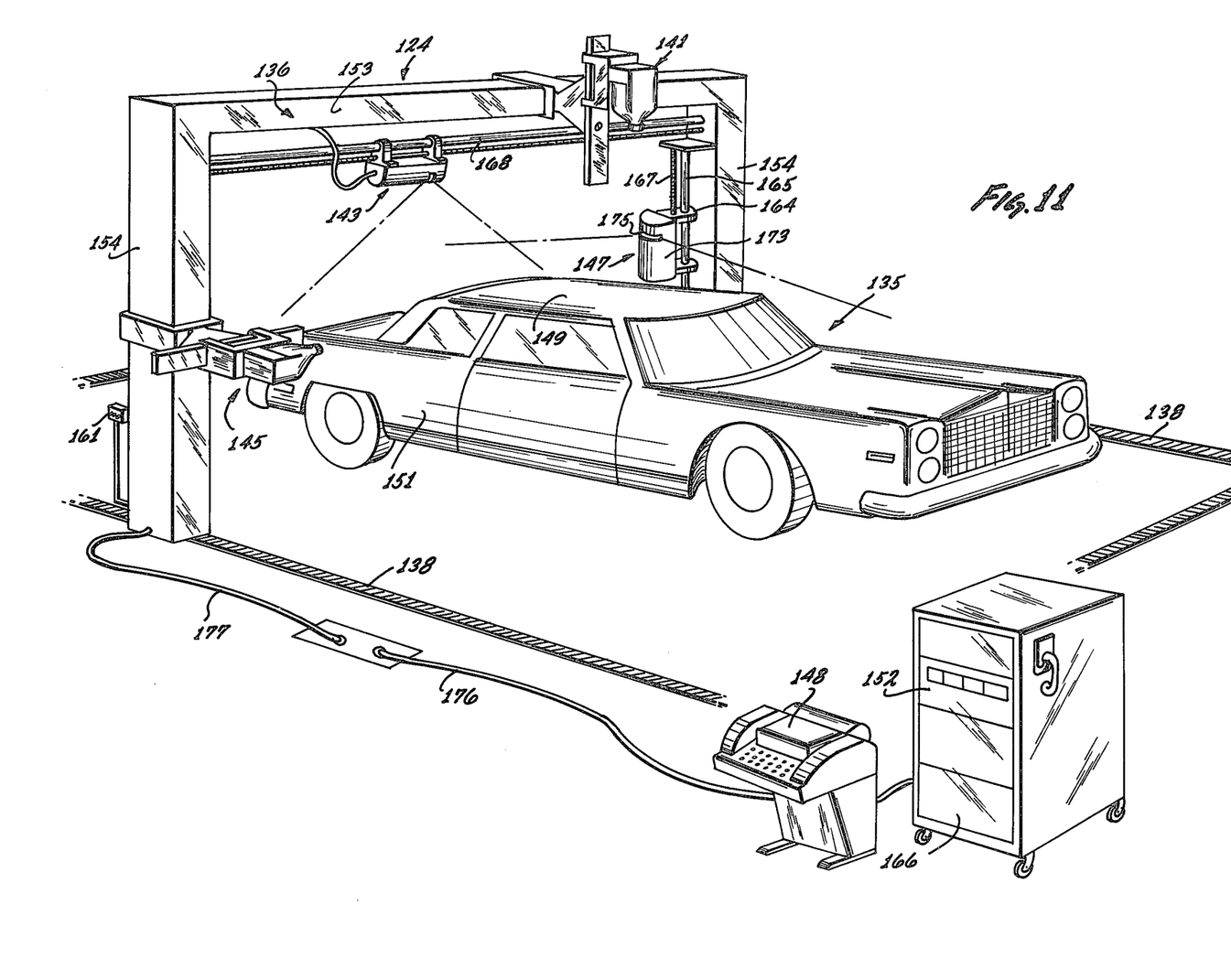
FIG. 11 is a view of an alternate embodiment of the digital contour generator of the present invention for use in obtaining digital coordinate data of the complex contoured surfaces of parts of large models.
Figure 12:
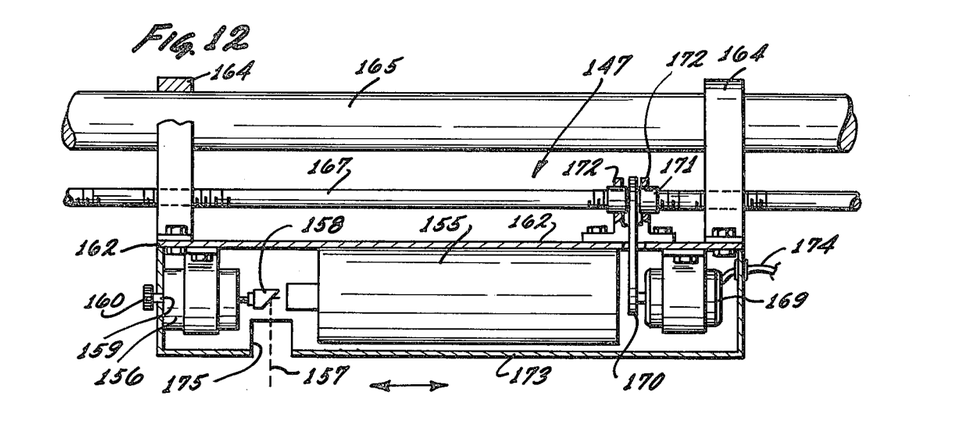
FIG. 12 is a view partly in section of the Z illuminator used in the apparatus of FIG. 11.

A non-contact digital contour generator 124 for large size models is shown in FIG. 12. The clay model 135 shown is that of a full size automobile. Spanning the model 135 is a bridge 136 which can be moved along the longitudinal axis of the model 135 via floor mounted rails 138. The rails 138 extend beyond the front and back of the model 135 and are precision leveled by shims (not shown). Although just one bridge 136 is shown, two or more may be provided.

On a horizontal beam portion 153 of the bridge 136 are mounted a vertical camera 141 and a vertical plane illuminator 143. On the respective side vertical pedestal portions 154 of the bridge are mounted a horizontal camera 145 and a horizontal plane illuminator 147.

The cameras 141 and 145 have the same structure as that shown and described for camera 15 in FIG. 1 or camera 180 in FIG. 13. The structure of illuminator 147, which is the same as illuminator 143, is shown in FIG. 12. It consists of a laser unit 155 and a motor 156 that rotates a 45 degree reflector 158 mounted on the end of motor shaft 159 through a full 360°. A knob 160 on the other end of the motor shaft provides for manual alignment. A mounting plate 162 supports the laser unit 155 and the motor 156 in precise alignment, and serves as a mounting surface for other parts of the assembly as will be described. The entire assembly can move in two directions as indicated by the arrows, as it is fixed to supporting sleeves 164 that slide along the vertical supporting rod 165 for vertical mounting (or the horizontal supporting rod 168 for mounting parallel to the floor). A threaded rod 167 is fixed at each end so that it will not turn in the same mount that supports the supporting rod 165. A stepper motor 169 drives a timing belt 170 that turns a nut 171 on threaded rod 167. The nut 171 is supported and turns freely in bearings held by a pair of brackets 172. Power for the laser unit 155, the motor 156 and clock pulses for stepper motor 169 are supplied through cable 174. A housing 173 covers and encloses the entire illuminator assembly except for opening 175 so that laser beam 157 can illuminate the model 135. The sides of the opening in housing 173 intercept the balance of the 360° sweep of the laser beam as a safety precaution.

The vertical camera 141 can be positioned to operate in conjunction with the horizontal plane illuminator 147, in the manner previously described, to digitize the roof panel 149 of the automobile, for example. Likewise, the horizontal camera 145 can be positioned to operate in conjunction with the vertical plane illuminator 143 to digitize the rear fender panel 151, for example. It should be appreciated that only one side of the automobile needs to be digitized since right and left side data can be generated by the computer 142.

It is assumed that any firm using a large scale system, as illustrated by the apparatus in FIG. 11, would have a central computer facility. Therefore, the equipment includes, in addition to power supplies 166, intercommunication to a computer room and computer interface electronics 152. Commands may be manually entered on the teletype 148 or other terminal. Cables 176 from the electronic equipment plug into floor (or ceiling) connectors which connect to the central computer. Another cable connection 177 is needed for the bridge 136. Stepper motors (not shown) drive the bridge 136 forward or backward via pinions meshing with the floor rails 138. The bridge 136 can be manually moved to the area of interest by manual switches 161 on the bridge itself. When moved by actuation of the manual switches, connections in the electronic module monitor the position of the bridge. The vertical and horizontal cameras 141 and 145 mounted on the bridge 136 can also be positioned by stepper motors (not shown) either from the bridge control for cruise positioning or automatically when digitizing is taking place.

Figures 14, 15:
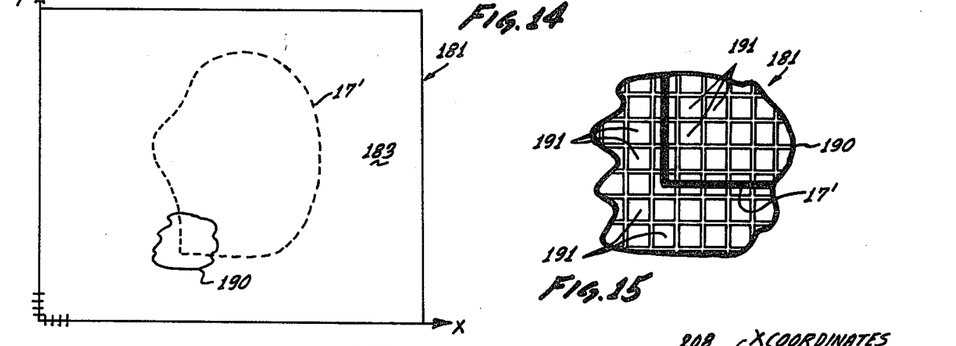
FIG. 14 is a plan sectional view showing the image plane of the camera in FIG. 13 as taken along lines 14—14 thereof.
FIG. 15 is a greatly enlarged view illustrating a portion of the matrix array in FIG. 14.

A modified camera 180 having a two-dimensional photodiode matrix or area array 181 in its image plane 183 is illustrated in FIGS. 13 and 14. This camera 180 provides for internal electronic self-scanning of the photodiode matrix 181 in both the X and Y directions. In FIG. 14, which is a plan sectional view as taken along lines 14—14 in FIG. 13, the two-dimensional photodiode matrix array 181 is shown positioned with its plane lying in the image 183 of the camera.

The matrix array 181 is integrated on a silicon chip and is comprised of on the order of 500 or more individual photodiodes 191 arranged in each of the X and Y coordinate directions. A greatly enlarged view of a portion 190 of the matrix array 181 is shown in FIG. 15. The photodiodes 191 have a center-to-center spacing in both coordinate directions of about 4 thousandths of an inch.

Figure 16:
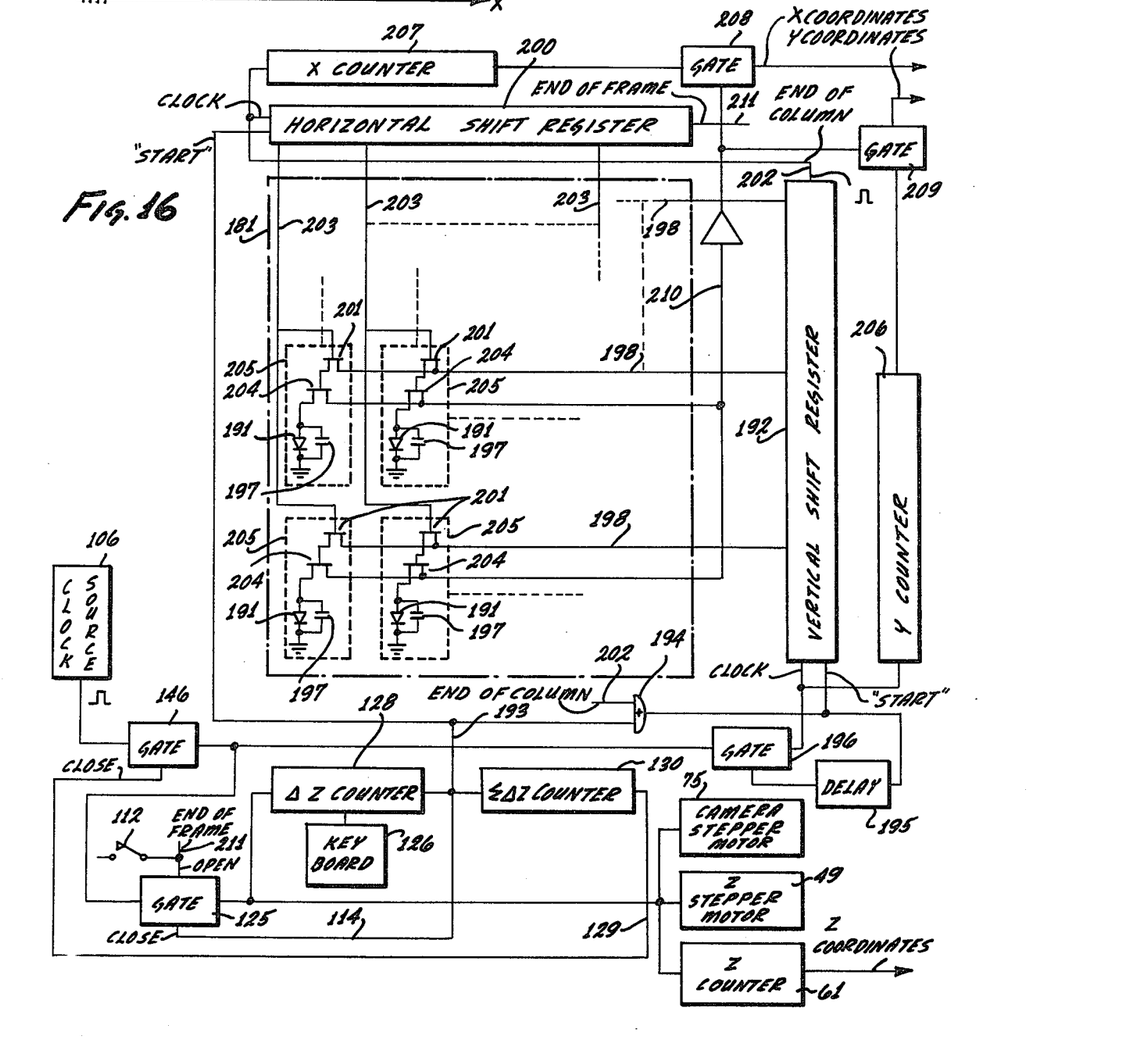
FIG. 16 is a functional block diagram of the electrical circuitry associated with the non-contact digital contour generator when embodying the camera shown in FIG. 13.

An overall functional block diagram of the electrical circuit for the non-contact digital contour generator 10 of the present invention when using the modified camera 180 in conjunction with the illuminator 12 (FIG. 1) is shown in FIG. 16. As illustrated, each of the photodiodes 191 in matrix array 181 is a part of a cell 205 which includes a parallel capacitor 197 and switching transistors 201 and 204. The cells 205, four of which are shown, extend throughout the matrix array. Associated with the matrix array 181 are a horizontal shift register 200 and a vertical shift register 192 which respectively provide output lines to the switching transistors 201 of each of the cells 205 and operate to successively interrogate the individual photodiodes 191.

As previously disclosed in connection with FIG. 10, a manual keyboard 126 is connected to provide an initial setting of the Z increment counter 128. Thus, to initiate the operation of the apparatus when using camera 180, a push button switch 112 is closed to open the Z input gate 125 to pass clock pulses from clock pulse source 106 to the Z stepper motor 49 of the illuminator 12 and the camera stepping motor 75. When these stepper motors have incremented to move the laser beam 57 and the camera 180 to a first incremental level relative to the model 16, the Z increment counter 128 provides an output on line 114. This output closes gate 125 and terminates the movement of these stepping motors.

The output of the Z increment counter 128 is also provided on line 193 which loads a bit into the "start" input of the horizontal shift register 200 and initially energizes the first output line 203 thereof, i.e., the leftmost line 203 shown. This output on line 193 is also fed through "or" logic circuit 194 directly to the "start" input of the vertical shift register 192, and, after a microsecond delay in delay 195, serves to open gate 196 to permit clock pulses from clock pulse source 106 to be fed into the clock input of the vertical shift register 192. Each clock pulse provides for advancing the bit loaded therein by the start pulse to thereby energize successive horizontal output lines 198 of the vertical shift register 192, starting with the lowermost line 198 shown.

It should now be clear that the energizing of a selected vertical output line 203 selects a column of photodiodes 191 in the matrix array 181 by applying a potential to the bases of all of the switching transistors 201 in the cells 205 of the column. Thereafter, the selected column of photodiodes 191 is scanned by successively energizing the horizontal output lines 198, i.e., by successively applying a potential to the emitters of the switching transistors 201 of each of the cells 205 in the column. This causes the switching transistors 204 of each of the cells to conduct to recharge its associated capacitor 197, if its associated photodiode 191 has been activated by the image 17'.

When the first column of photodiodes 191 has been interrogated in this way the end of column pulse on the output line 202 of the vertical shift register 192 is fed to the clock input of the horizontal shift register 200. Each end of column pulse provides for advancing the bit loaded in by the start pulse to thereby energize successive vertical output lines 203 of the horizontal shift register 200.

The end of the column pulse on the output 203 of the vertical shift register 192 is also connected through "or" logic circuit 194 to the "start" input of the vertical shift register 192 to load a bit back into this register. This bit is then advanced in the register by the clock pulses causing a potential to be applied to the successive output lines 203 so as to scan the new selected column of photodiodes 191.

A Y counter 206 counts the clock pulses received at the clock input of the vertical shift register 192 and provides a digitized count output corresponding to the position along the Y axis of the matrix array 181 of each of the photodiodes 191 being interrogated.

An X counter 207 counts the clock pulses (actually the end of column pulses) received at the input of the horizontal shift register 200 and provides a digitized count output corresponding to the position along the X axis of the matrix array 181 of each of the photodiodes 191 being interrogated.

When a photodiode 191 in a particular cell 205 is selected for interrogation by the horizintal and vertical shift registers 200 and 192, the switching transistor 201 of the cell conducts causing its associated switching transistor 204 to conduct. The switching transistor 204 connects each of the photodiodes 191 and ita parallel capacitor 197 to a common video line 210. Thus, whenever a photodiode 191 of a selected cell has been activated by the light of image 17' (see FIG. 15), the photocurrent it conducts causes its associated capacitor 197 to recharge and a pulse to appear on the common video line 210. This pulse opens gate 208 and serves to provide the digitized output of the X counter 207 as an X coordinate. Simultaneously, this pulse on the common video line 210 opens gate 209 and serves to provide the digitized output of the Y counter 206 as a Y coordinate. These X and Y coordinates together with the Z coordinate provided by the Z counter 61 define a point on the surface of the model 16 relative to a predetermined base and successive sets of these coordinates define successive points along the surface of the model.

When the end of frame pulse is provided on output line 211 of the horizontal shift register 200, this pulse is fed to open the Z input gate 125. This causes clock pulses to again be fed to the Z stepper motor 49 and camera stepper motor 75 to reposition the Z illuminator 12 and camera 180 to the next incremental level to enable the laser beam 57 to form a new contour line 17 on the model 16. The scanning and digitizing of this new contour line 17 as imaged on the image plane 183 of camera 180 is then performed in the manner described above. The scanning of the images 17' of successive new contour lines 17 on incremental planes of the model 16 continues until the Z range counter 130 indicates that the digitizing of the model 12 has been completed. At that instant, a pulse on the output line 129 of the Z range counter 130 is fed to close the Z input gate 125, thus terminating the operation of the apparatus.

It should now be clear that after a part such as a housing has been cast by use of dies which have been machined by use of coordinate data obtained by digitizing the model 16, the housing may then be digitized by replacing the model 16 on the table 13 with the housing. The coordinate data of the housing can then be fed to the general purpose computer 142 (FIG. 7) and compared with the coordinate data of the model stored therein to determine if the housing comes within the desired tolerance range.

While the non-contact digital contour generator shown and described herein is admirably adapted to fulfill the objects and advantages previously mentioned as desirable, it is to be understood that the invention is not limited to the specific features shown and described but that the means and configuration herein disclosed are susceptible of modification in form, proportion and arrangement of parts without departing from the principles involved or sacrificing any of its advantages and the invention therefore may be embodied in various forms within the scope of the appended claims.

What is claimed is:

1. A non-contact digital contour generator for generating the X, Y and Z coordinates of the surface of a three-dimensional model comprising:

an adjustably mounted light source for successively providing contour lines about said model at different levels thereof, the movement of said light source being measured to provide a first of said coordinates;

a camera having an object plane and an image plane, said camera having its optical axis disposed perpendicular to the plane of the contour line and adjustably mounted such that its object plane is maintained in the plane of the contour line as the latter is changed to a different level so as to focus the image of the contour line on said image plane; and scanning means including photosensitive means located in the image plane of said camera for scanning the successive images of the contour lines focussed thereon to provide the second and third of said coordinates.

2. A non-contact digital contour generator for generating coordinates of the contoured surface of a three-dimensional model comprising:

a light source having a beam disposed perpendicular to a first axis for forming a contour line on the surface of said model;

means for moving said light source and defining the coordinates of the plane of said contour line along said first axis;

an objective lens having an object plane and an image plane, said objective lens having its optical axis disposed perpendicular to the plane of the contour line formed about the surface of said model and having its object plane lying in the plane of said contour line so as to focus the image of the contour line on its image plane; and scanning means including photosensitive elements disposed in the image plane for scanning the image of the contour line focussed thereon to define the coordinates thereof along second and third axes perpendicular to each other and to said first axis.

3. Apparatus for generating the X, Y and Z coordinates of the surface of a complex-shaped three-dimensional model comprising:
   an illuminator means movable relative to said model along one coordinate direction to form contour lines at imcremental planes along the height of the model and operable to provide coordinates of the planes of said contour lines along said one coordinate direction;
   a camera means having an object plane and an image plane and disposed with its optical axis aligned with said one coordinate direction and movable therealong with the illuminator means such that the object plane of the camera means remains coincident with the incremental planes of said contour lines formed on said model and provides for focussing said contour lines onto the image plane of the camera means; and
   scanning means including photosensitive means located in the image plane of said camera means for scanning the successive images of the contour lines focussed thereon to provide coordinates thereof along the other two coordinate directions.

4. Apparatus in accordance with claim 3 wherein said illuminator means includes a laser beam rotatable about the model and reflector means incrementally movable along said one coordinate direction for reflecting said laser beam onto the periphery of the model to form said contour lines thereon at incremental planes.

5. Apparatus in accordance with claim 3 wherein said illuminator means includes means for forming a thin sheet of light disposed in planes perpendicular to said one coordinate direction.

6. Apparatus in accordance with claim 3 wherein said illuminator means includes a rotatable angular reflector that provides for sweeping a light beam to define a plane disposed perpendicular to said one coordinate direction.

7. Apparatus in accordance with claim 3 wherein said photosensitive means includes a linear array of photodiodes oriented in one of the coordinate directions of the image plane, and said scanning means includes means for moving said linear array along the other of the coordinate directions of said image plane.

8. Apparatus in accordance with claim 3 wherein said photosensitive means comprises a two-dimensional matrix array of photodiodes.

9. Apparatus for generating the X, Y and Z coordinates of the surface of a complex shaped three-dimensional model comprising:
   an illuminator means incrementally movable relative to said model along the Z axis to provide contour lines at different planes along the height of the model, said illuminator means providing Z coordinates of the planes of said contour lines;
   a camera having an optical axis disposed perpendicular to the planes of the contour lines formed on said model, said camera having an object plane and an image plane lying in the X-Y coordinate plane, and positioned and maintained with its object plane coincident at all times with the plane of said contour line, whereby the images of the contour lines on the model are focussed on the X-Y image plane of the camera;
   a linear array of photodiodes lying in and oriented in the Y axis of said X-Y image plane and incrementally movable along the axis thereof, said camera providing X coordinates of the incremental position of said linear array; and
   means for scanning said linear array of photodiodes at each incremental position along the X axis of the image plane to provide Y coordinates of the contour line imaged thereon which together with the X coordinates and the Z coordinates define the shape of the model at each of the planes along the height of the model.

10. Apparatus for generating X, Y and Z coordinates corresponding to points on the surface of a complex-shaped three-dimensional model comprising:
    an illuminator movable in a Z coordinate direction and providing an intense light beam directed at said model to provide a contour line of light about the periphery thereof;
    digital means for incrementally advancing said illuminator in the Z coordinate direction and providing a Z coordinate corresponding to the location of the plane of the contour line of light;
    a camera having an X-Y image plane disposed parallel to the plane of said contour line of light, said camera having a linear array of photodiodes disposed in the Y coordinate direction of said X-Y image plane;
    digital means for incrementally advancing said linear array in the X coordinate direction of said X-Y image plane and providing X coordinates corresponding to the location thereof; and
    electronic means for scanning said linear array of photodiodes at each X incremental position of said linear array and providing Y coordinates corresponding to which ones of the photodiodes are activated by the image of the contour line.

11. A method of reproducing a three-dimensional model having complex curved surfaces comprising:
    directing an illuminator incrementally movable along a Z axis to form contour lines of light about the periphery of the model and providing the Z coordinates of the planes of said contour lines;
    providing an objective lens having an optical axis disposed perpendicular to the planes of the contour lines of light;
    positioning and maintaining the object plane of said objective lens in the planes of the contour lines of light;
    focussing the contour lines of light on the model by use of the objective lens as reduced images on an X-Y image plane;
    positioning a two-dimensional matrix array of photosensitive elements in said X-Y image plane;
    serially scanning said photosensitive elements in said two-dimensional matrix array and providing the X and Y coordinates of the images of said contour lines of light on said model;
    feeding said X, Y and Z coordinates into a general purpose computer, and
    modifying said X, Y and Z coordinates to provide a numerical control tape to control a machine tool to reproduce the model.

* * * * *